(12) United States Patent
Elin

(10) Patent No.: US 8,738,077 B2
(45) Date of Patent: May 27, 2014

(54) MOBILE RADIO UNIT WITH A DOSIMETER-RADIOMETER

(76) Inventor: Vladimir Aleksandrovich Elin, Moscow (RU)

(*) Notice: Subject to any disclaimer, the term of this patent is extended or adjusted under 35 U.S.C. 154(b) by 250 days.

(21) Appl. No.: 13/321,273

(22) PCT Filed: Jul. 5, 2011

(86) PCT No.: PCT/RU2011/000486
§ 371 (c)(1),
(2), (4) Date: Nov. 18, 2011

(87) PCT Pub. No.: WO2012/177167
PCT Pub. Date: Dec. 27, 2012

(65) Prior Publication Data
US 2012/0329517 A1     Dec. 27, 2012

(30) Foreign Application Priority Data

Jun. 24, 2011   (RU) ................................ 2011126013

(51) Int. Cl.
*H04M 1/00*   (2006.01)

(52) U.S. Cl.
USPC ................. 455/556.1; 340/425.5; 340/539.16; 340/539.22; 340/870.01; 250/366; 250/390.01; 250/473.1; 250/474.1; 250/484.5; 342/457; 252/301.16; 701/115; 429/122

(58) Field of Classification Search
USPC .......... 455/556.1; 340/539.22, 870.01, 425.5; 250/474.1, 484.5, 516.1, 366, 390.01; 250/473.1; 342/357.59, 357.75, 457, 35.59; 701/115; 252/301.16; 429/122
See application file for complete search history.

(56) References Cited

U.S. PATENT DOCUMENTS

| | | | | |
|---|---|---|---|---|
| 5,110,500 A * | 5/1992 | Walker | ................. | 252/301.16 |
| 5,748,147 A * | 5/1998 | Bickley et al. | ................. | 342/457 |
| 5,969,673 A * | 10/1999 | Bickley et al. | ............ | 342/357.59 |
| 5,982,322 A * | 11/1999 | Bickley et al. | ............ | 342/357.59 |
| 5,983,156 A * | 11/1999 | Andrews | ................. | 701/115 |
| 6,151,549 A * | 11/2000 | Andrews et al. | ................. | 701/115 |
| 6,414,324 B1 * | 7/2002 | Colyott et al. | ............ | 250/484.5 |
| 6,980,092 B2 * | 12/2005 | Turnbull et al. | ............ | 340/425.5 |
| 7,023,379 B2 * | 4/2006 | Turnbull | ................. | 342/357.75 |
| 7,098,463 B2 * | 8/2006 | Adamovics | ................. | 250/474.1 |
| 7,351,985 B2 * | 4/2008 | Antanouski | ................. | 250/484.5 |
| 8,294,572 B2 * | 10/2012 | Kuris et al. | ................. | 340/539.22 |
| 8,399,858 B2 * | 3/2013 | Yoder et al. | ................. | 250/473.1 |
| 8,441,371 B2 * | 5/2013 | Kuris et al. | ................. | 340/870.01 |
| 2004/0004196 A1 * | 1/2004 | DeMeo et al. | ............ | 250/516.1 |
| 2004/0211917 A1 * | 10/2004 | Adamovics | ................. | 250/474.1 |

(Continued)

Primary Examiner — William D Cumming
(74) Attorney, Agent, or Firm — Nath, Goldberg & Meyer; Jerald L. Meyer

(57) ABSTRACT

The mobile radio unit (phone, smartphone) comprises body 16 with an incorporated processor 1. The processor 1 is connected with memory 2, display 3, audible alarm aids 4, keyboard 5, power unit 6, navigator 9, and transceiver 15. The radio unit is equipped with radiation detector 8, electronic amplifier 7 and interface 10 connected to the processor 1. The detector 8 provides measuring alpha-, beta-, gamma- and neutron emissions and solar radiation levels. The processor 1 is provided with software, which ensures both communication functions and control, warning of exposure levels, measuring background radiation, building diagrams illustrating state of human organs. The keyboard 5 comprises keys for dosimeter and/or radiometer mode control. The detector 8, the interface 10 and the amplifier 7 can be placed in the mobile unit body 16 or in separate detachable unit. Thus, there was constructed an efficient mobile unit, which ensures an extended functionality.

8 Claims, 1 Drawing Sheet

(56) References Cited

U.S. PATENT DOCUMENTS

| | | | |
|---|---|---|---|
| 2006/0163493 A1* | 7/2006 | Antanouski | 250/484.5 |
| 2008/0157959 A1* | 7/2008 | Kuris et al. | 340/539.22 |
| 2010/0304204 A1* | 12/2010 | Routkevitch et al. | 429/122 |
| 2011/0278464 A1* | 11/2011 | Clark et al. | 250/366 |
| 2012/0261639 A1* | 10/2012 | Weinberg et al. | 257/9 |
| 2012/0305788 A1* | 12/2012 | Fischbach et al. | 250/390.01 |
| 2012/0329517 A1* | 12/2012 | Elin | 455/556.1 |
| 2013/0009772 A1* | 1/2013 | Kuris et al. | 340/539.16 |

* cited by examiner

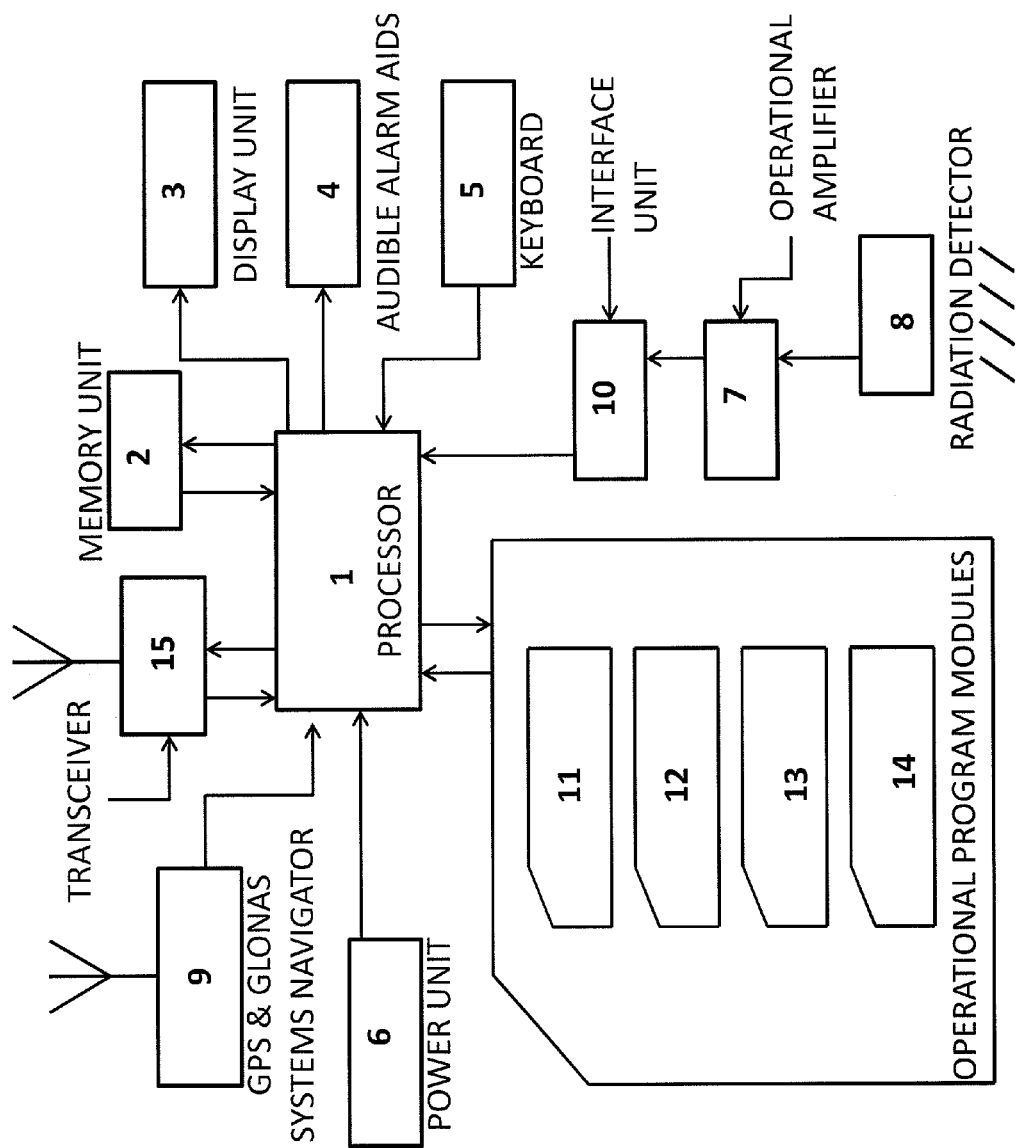

MOBILE RADIO UNIT WITH A DOSIMETER-RADIOMETER

This is a National Phase Application filed under 35 U.S.C. §371 as a national stage of PCT/RU2011/000486, filed on Jul. 5, 2011, an application claiming the benefit under 35 U.S.C. §119 of Russian Application No. 2011126013, filed on Jun. 24, 2011, the content of each of which is hereby incorporated by reference in its entirety.

FIELD OF THE INVENTION

The useful invention pertains to the category of mobile communications devices (mobile phones, cell phones, smartphones) equipped with accessories, namely, to portable RF units with an integrated module for measuring and processing of measured values designed as dosimeter-radiometer (DOzimetr-RAdiometr, "DO-RA" in short).

With a view to Chernobyl and Fukushima-1 catastrophes, the world has become more cautious of the way radiation affects human organisms in contaminated areas, in areas adjacent to those as well as in remote locations where radioactive decay products could be brought with the wind, rain, underground waters, and waters of rivers, seas and oceans. Dosimeters and radiometers are available in various designs with a free-standing body, containing equipment and visual display aids. However, it would be neither reasonable nor convenient to provide each person with individual radiation monitoring aids, such as mobile devices requiring constant carrying and each containing power supply, alarm and display components.

PRIOR ART

There are mobile phones which are equipped with integrated accessories.

There also exists a cell phone which uses an independent command device designed as a mobile phone case and intended for conversion, via an electromechanical node, of the electric signal, transmitted by the electronic unit on safety sensor triggering, into a mechanical action on a cell phone key for further alarm activation, which is actually a subscriber call via the "shortcut dialing" cell phone function. The cell phone also provides for a possibility of GSM communication with "block all incoming calls" function (RU No. 102282).

There is also a mobile radio unit with an integrated measurement module shielded to ensure protection against the electromagnetic waves generated by the mobile radio unit (WO 2006/092323).

There exists a mobile (cell) phone with auxiliary functions, containing a transceiver (a transmit-receive device) for transmission and receipt of sound (audible alarms) and data signals and equipped with a signal-processing circuit, which, when in operation, connects to the transceiver and the microprocessor set for processing signals transmitted and received by the transceiver. The phone also includes components, such as a storage memory (a memory unit), a push-button panel (a keyboard), a display (a monitor), an accumulator unit (a power unit), and a body. Additionally, it is equipped with a special accessory—an electrooptical module for measuring distances, areas, volumes and processing measured values, which, when in operation, connects to the push-button panel, the display, the accumulator unit, the transceiver and the microprocessor set. The microprocessor set provides the possibility to stop electrooptical module operation on receiving an incoming call, saving its measurement results as appropriate. (RU No. 70434 (prototype)).

The disadvantages of the available mobile radio units are their limited functionality which does not ensure proper radiation monitoring.

SUMMARY OF THE INVENTION

As for the useful invention, the technical task in its case is to ensure an efficient mobile device design which would provide for some auxiliary functions and to expand the range of mobile radio units available.

The technical result required to ensure an appropriate solution to the task as above would be expanding functionality so as to provide for detection, measurement, storage and processing of radiation environment parameters, area-specific radiation contamination monitoring and generation of respective data in a comprehensible and applicable format.

In particular, there should be provided means for indication of limit, admissible and inadmissible radiation levels over hourly, daily, weekly, monthly and yearly intervals, for measuring background radiation, for generating diagrams illustrating states of human organs and systems, depending on accumulated radiation dose, as well as for display of respective information screen messages.

The essence of the useful invention is that the mobile radio unit includes a body with an incorporated electrically interconnected transceiver and microprocessor set, with a display, a keyboard, a memory unit, a power unit and audible alarms connected to the latter. The device is also equipped with a semiconductor radiation detector, an amplifier and an interface unit interconnected in series. The output of the interface unit is connected to the microprocessor set with a possibility to generate audible and visual dosimeter and radiometer indication with use of the above audible alarms and display.

Preferably, the radiation detector should de designed for measurement of alpha-, beta-, gamma- and neutron emissions as well as solar radiation levels.

As a rule, the microprocessor set is provided with a software for generating admissible, limit and inadmissible radiation level alarms, measuring background radiation and building diagrams illustrating states of human organs and systems, depending on accumulated radiation dose, and working out preventive recommendations as well as for screen display of respective information messages in the form of diagrams, tables and texts. Besides, the microprocessor set is provided with a software generating admissible, limit and inadmissible radiation level alarms over hourly, daily, weekly, monthly and yearly intervals.

Moreover, the keyboard contains additional keys for operation control in dosimeter-radiometer mode.

The radio unit is equipped with a navigator for positioning via GPS and GLONAS systems.

In some radio unit designs, the radiation detector, the amplifier and the interface unit are placed within its body, in others—the radiation detector, the amplifier and the interface unit are located in a detachable case.

DESCRIPTION OF THE DRAWING

The drawing FIG. 1 shows a principal block diagram of a mobile radio unit with a dosimeter-radiometer ("DO-RA").

DETAILED DESCRIPTION OF THE INVENTION

The mobile radio unit (a cell/mobile phone, smartphone) includes a body 16 (in conventional representation), inside which there is a processor 1. The processor 1 is connected with a memory unit 2, a display unit 3 and audible alarm aids 4, a keyboard 5, a power unit 6, a GPS and GLONAS systems navigator 9, a transceiver (Wi-Fi/GPRS transmit-receive device) 15. The mobile radio unit (RF unit) is equipped with a semiconductor radiation detector 8, an operational electronic amplifier 7 and an interface unit 10, interconnected in series. The interface unit is connected with the processor 1 to ensure interaction with the rest of the above RF unit components.

The detector 8 is a sensitive element used for conversion of events caused by radioactive (ionizing) emissions into electrical or other kinds of signals. The radiation detector 8 is designed for measurement of alpha-, beta-, gamma- and neutron emissions as well as solar radiation levels.

The processor 1 is provided with a software, designed both for implementation of RF unit functions and data monitoring, accumulation and generation of limit, admissible and inadmissible radiation level alarms, measuring background radiation, building diagrams illustrating state of human organs and systems, depending on accumulated radiation dose, working out preventive recommendations, and for indication on the display unit 3 of respective data diagrams, tables and text screen messages. The software includes four operation program modules, conventionally shown in the drawing:

data module 11 "Dosimeter"
data module 12 "Radiometer"
data module 13 "Effects on separate human body organs"
data module 14 "Solar radiation level"

A dosimeter is a device for measuring level and intensity of ionizing radiation affecting the device (or those who use it) over a time interval, for example, over the period it is stored in a certain area or over a working shift.

A radiometer is a device for measuring ionizing radiation flux density for radioactive emission checks on suspicious objects and for evaluation of a radiation environment in a certain area at a given time.

Thus, the circuit itself, comprising a radiation detector 8, an operational amplifier 7 and an interface unit 10, cannot ensure implementation of dosimeter and radiometer functions as an independent device.

The processor 1 is provided with a software for generating visual, audible o voice alarms via respective aids 4 to indicate admissible, limit and inadmissible radiation levels over hourly, daily, weekly, monthly and yearly intervals.

The keyboard 5 contains additional keys (not shown) for control of dosimeter and/or radiometer operation.

Implementation of dosimeter and radiometer functions is defined by the processor 1 program, with both dosimeter and radiometer circuits formed by a detector 8, an interface unit 10, an amplifier 7 and the total of mobile RF unit components. The detector unit 8, the interface unit 10 and the amplifier 7 can be integrated into the mobile RF unit body 16 or placed within a separate detachable case (not shown).

A smartphone is an advanced mobile phone version with an operating system of its own and extended customization possibilities.

Thus, by combining the interacting devices (circuit elements) 1-10, 15 into a single unit, it was possible to achieve their constructional integrity and functional interdependence, which, consequently, contributed to a new extended functionality mobile RF unit.

The operation of the mobile RF unit with a dosimeter-radiometer is as follows.

On putting the RF unit into operation, the navigator 9, the transceiver 15 and the detector 8 switch on. The navigator unit 9 receives GPS/GLONAS system coordinates and registers them in the memory unit 2. Power supply for the RF unit, as a whole, is provided by the power unit 6 in a conventional way, just like in standard mobile phones (smartphones). Besides, the detector 8, affected by radioactive emissions, generates signals, which are then amplified by the amplifier 7, converted by the interface unit 10 and processed by the processor set 1, while providing for measurements of admissible, limit and inadmissible radiation levels over hourly, daily, weekly, monthly, yearly intervals and detection of background radiation levels, building diagrams illustrating human organs and systems state, depending on accumulated radiation dose, working out preventive recommendations, depending on accumulated radiation dose, and defining current solar radiation parameters with their simultaneous registering in the memory unit 2. Further, the above data are transmitted via the transceiver 15 (Wi-Fi/GPRS) to the centralized, e.g., fixed, server for data processing by a mobile communication service provider, where the data is stored, processed and distributed, for example, among those participating in "Our Radioactive World" campaign. The participants of "Our Radioactive World" campaign are voluntary owners of a DO-RA device and users of the GPS/GLONAS service for radioactive contamination area and range mapping.

On switching on the RF unit and pressing respective keys on the keyboard 5, appropriate data are indicated on the same display 3, including both data on text messages and missed calls and the above data on the radiation environment and solar radiation levels.

The same audible alarm aids 4 inform the user about incoming RF signals received by the processor 1 and, as soon as limit values are reached,—about limit admissible and/or inadmissible radiation levels over a preset hourly, daily, monthly, yearly interval. Data on ionizing radiation exposure dose is indicated on the same RF unit display 3 as a numerical value in units, such as μR/h o μSv/h. These units can be converted, adjusted and indicated on the display 3 screen as units accepted in the user's country of residence.

The unit 9 boasts GPS/GLONAS system-based navigation aids (not shown) for positioning.

The GPS/GLONAS system-based navigation aids for positioning visualize data on RF unit location on the same display 3, transmitting them via the navigator 9 and the processor 1.

The claimed technical solution ensures implementation of dosimeter-radiometer functions via mobile phones and smartphones with use of a minimum number of integrated or attached components, allowing the RF unit, as a whole, not only to maintain telecommunications but also to measure radiation exposure dose, affecting its owner and the background radiation within the measurement area. The relevancy of the technical solution is mostly due to the fact that today a mobile phone is actually an extension of our bodies. We hardly ever part with our mobile phones or smartphones throughout the working day, that's why dosimeter-radiometer functions are smoothly integrated within mobile phone or smartphone functions, thus providing for a considerable expansion and diversification of their overall functionality.

The radiometer function for radiation environment analysis is software-programmed, based on the same elements as the dosimeter function. The phone- or smartphone integrated option helps users monitor radioactive contamination not only for a certain area, irrespective of users' location, but for food products, water and other objects of individual and domestic use, thus ensuring health protection.

The GPS/GLONAS system-based RF unit positioning function, available for smartphones, provides for automatic collection of objective data on background radiation in places to which smartphone users have been.

The useful invention can be implemented based on any mobile phone or smartphone invention, with dosimeter-radiometer functions partially accomplished with use of mobile or smartphone circuit components as "DO-RA" constructional constituent elements. "DO-RA" operations in dosimeter-radiometer modes are carried out based on specially-developed software packages and the operating system used by a certain mobile phone, smartphone. In the dosimeter-radiometer mode, power for "DO-RA" is supplied from a standard accumulator unit (unit 6) of a mobile phone or a smartphone. The detector 8 circuit can be either structurally integrated into the phone circuit, if these are new mobile phone or smartphone inventions, or provided as a detachable (attached-type) device. Dosimeter-radiometer operation is ensured by the internal interconnections and communications of mobile/smartphone and is controlled by a dedicated processor 1 software package.

Thus, the claimed RF unit, as a whole, is suitable for accomplishing a range of objectives:
ensuring mobile telecommunications;
measuring background radiation levels;
detecting and identifying objects of radioactive hazard;
determining whether a certain product is eatable or not.
defining healthy suntan radiation levels, accounting for individual complexion types.

Thus, the RF unit can even be used for measuring and analyzing solar radiation levels and provides for identifying admissible exposure levels and intensities for each of the complexion types, from light to dark, and warning via notification systems of limit solar exposure times for open beach spaces and other sunbathing facilities.

Accumulative radioactive exposures of the "DO-RA" equipped mobile phone or smartphone owner over hourly, daily, weekly, yearly intervals, measured in the dosimeter mode, are visualized on the display via special graphic files and programs.

Admissible, limit and inadmissible radiation levels in the dosimeter mode are communicated via mobile/smartphone systems as voice commands: "normal radiation level," "limit radiation level," "inadmissible radiation level." Radiation level values are indicated as audible alarms of respective tone ranges.

Continuous solar radiation level monitoring, with recommendations for each complexion type.

Measuring radiation levels for a specific area, objects, water, food products and etc. in the radiometer mode. Background radiation levels for a specific area and objects are visualized on a mobile/smartphone display via special graphic files and programs.

Building diagrams illustrating the state of organs and systems of a "DO-RA" equipped mobile/smartphone owner, depending on the received or accumulated radiation dose, based on dosimeter data, which is executed via special graphic files and programs, and further visualization of those on mobile RF unit displays.

Working out preventive recommendations for an owner of a "DO-RA" equipped mobile/smartphone, depending on the received or accumulated radiation dose, based on dosimeter data, which are then visualized as text messages on mobile RF unit displays.

Real-time mode automatic preparation of background radiation reports for areas of location of a "DO-RA" equipped mobile/smartphone owner is carried out with use of GPS and GLONAS based coordinates via mobile communication service providers.

Automatic transmission of data on radiation environment, surrounding an owner of a "DO-RA" equipped mobile/smartphone, in accordance with their ground position to the Global Radiation Environment Evaluation Center, active in the radiometer mode and used for further data processing and analysis.

The data, accumulated by the Global Radiation Environment Evaluation Center, in the form of visualized maps of area ranges, water spaces and other facilities exhibiting radioactive contamination levels, as proceeds from data collection carried out by "DO-RA" equipped mobile RF units (radio units), is provided for all participants of "Our Radioactive World" campaign free of charge.

Thus, there was accomplished an efficient mobile RF unit, ensuring an extended functionality, and the range of mobile RF units was amplified.

INDUSTRIAL APPLICATIONS

The present invention is implemented using the universal modern equipment available in the industry.

The invention claimed is:

1. A mobile radio unit, comprising:
a body housing an electrically interconnected transceiver, a processor, a display unit, a keyboard, a memory unit, a power unit, and audible alarm aids;
a semiconductor radiation detector;
an amplifier; and
an interface unit, wherein
the display unit, the keyboard, the memory unit and the audible alarm aids are connected to the processor,
the semiconductor radiation detector, the amplifier and the interface unit are interconnected in series,
an output of the interface unit is connected to the processor, and
the mobile radio unit is configured to generate dosimeter and radiometer audible and visual alarms via the audible alarm aids and the display unit.

2. The mobile radio unit according to claim 1, wherein the semiconductor radiation detector is designed for measuring alpha-, beta-, gamma- and neutron emissions and solar radiation levels.

3. The mobile radio unit according to claim 1, wherein the processor comprises software configured to:
generate admissible, limit and inadmissible level alarms,
measure background radiation,
build diagrams illustrating state of human organs and systems,
determine preventive recommendations, and
visualize information messages on displays in the form of graphics, tables, and texts,
wherein said building diagrams and preventative recommendations are dependent on an accumulated radiation dose.

4. The mobile radio unit according to claim 3, wherein the processor software is configured to generate admissible, limit and inadmissible level alarms over hourly, daily, weekly, monthly and yearly intervals.

5. The mobile radio unit according to claim 1, wherein the keyboard is configured to include keys for a dosimeter-radiometer mode control.

6. The mobile radio unit according to claim 1, further comprising navigation aids for positioning via GPS and GLONAS systems.

7. The mobile radio unit according to claim 1, wherein the radiation detector, the amplifier and the interface units are located inside the body.

8. The mobile radio unit according to claim 1, wherein the radiation detector, the amplifier and the interface units located in a detachable case.

\* \* \* \* \*